US009870482B1

(12) United States Patent
Mohen et al.

(10) Patent No.: US 9,870,482 B1
(45) Date of Patent: Jan. 16, 2018

(54) METHOD AND SYSTEM FOR MANAGING AND TRACKING CONTENT DISSEMINATION IN AN ENTERPRISE

(71) Applicant: Open Text Corporation, Waterloo (CA)

(72) Inventors: Michael T. Mohen, Millington, MD (US); Paul Craig Warren, Pleasanton, CA (US); Una Kearns, Dublin (IE); Chandra Mouli Addaguduru, Bangalore (IN); Ameya Devendra Bapat, Bangalore (IN)

(73) Assignee: Open Text Corporation, Waterloo (CA)

( * ) Notice: Subject to any disclaimer, the term of this patent is extended or adjusted under 35 U.S.C. 154(b) by 0 days.

(21) Appl. No.: 14/871,126

(22) Filed: Sep. 30, 2015

(51) Int. Cl.
*G06F 21/62* (2013.01)
*G06F 17/30* (2006.01)

(52) U.S. Cl.
CPC .... *G06F 21/6218* (2013.01); *G06F 17/30011* (2013.01)

(58) Field of Classification Search
CPC ..... H04L 63/20; G06F 11/3089; G06F 11/323
See application file for complete search history.

(56) References Cited

U.S. PATENT DOCUMENTS

| 7,386,439 | B1* | 6/2008 | Charnock | G06F 17/30699 704/9 |
|---|---|---|---|---|
| 8,499,152 | B1* | 7/2013 | Chen | H04L 63/102 713/155 |
| 2004/0153456 | A1* | 8/2004 | Charnock | G06F 17/30713 |
| 2008/0301207 | A1* | 12/2008 | Demarest | G06F 17/30563 |
| 2011/0320508 | A1* | 12/2011 | Naito | G06F 17/3012 707/827 |
| 2013/0191630 | A1* | 7/2013 | Ylonen | H04L 63/1483 713/153 |
| 2013/0212707 | A1* | 8/2013 | Donahue | H04L 63/10 726/29 |
| 2013/0254699 | A1* | 9/2013 | Bashir | G06F 3/0481 715/772 |

OTHER PUBLICATIONS

Mendo, Tiago Gomez da Silva; Document Flow Tracking Within Corporate Networks; 2011; Univsersity of Lisboa, Retrieved from: <http://repositorio.ul.pt/handle/10451/3953>; pp. 1-75 as printed.*

* cited by examiner

*Primary Examiner* — Saleh Najjar
*Assistant Examiner* — Michael Chao
(74) *Attorney, Agent, or Firm* — Sprinkle IP Law Group

(57) ABSTRACT

A method and system for managing document dissemination, including obtaining a plurality of operation logs from a plurality of local agents, where each of the plurality of local agents is executing on one of a plurality of clients. The method further includes identifying a document stored on a client of the plurality of clients, determining, using at least one of the plurality of operation logs, a dissemination path of the document between the plurality of clients, and performing an action based on the dissemination path of the document.

20 Claims, 12 Drawing Sheets

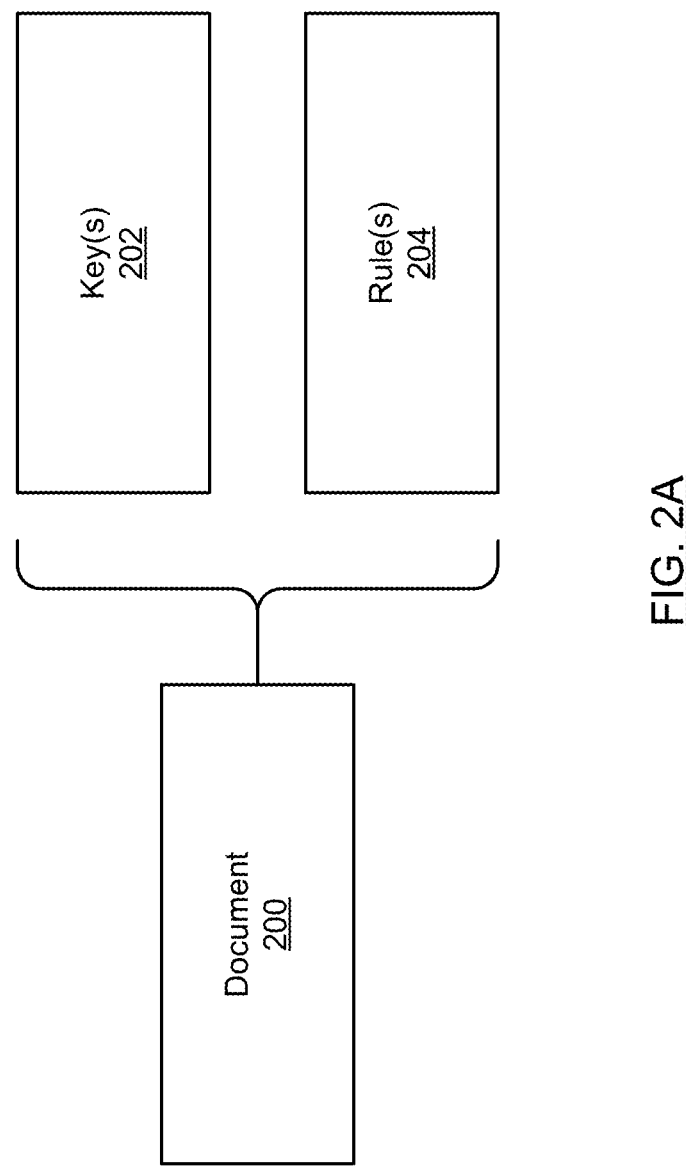

METHOD AND SYSTEM FOR MANAGING AND TRACKING CONTENT DISSEMINATION IN AN ENTERPRISE

BACKGROUND

Companies typically tend to create large numbers of documents. Many of these documents include sensitive information. Accordingly, companies may take various steps to manage how various users interact with documents that include sensitive information. However, these companies are unable to effectively manage access to document and further are unable to track how sensitive documents are disseminated between users in a company.

BRIEF DESCRIPTION OF DRAWINGS

FIGS. 2A-2B show the relationship between various components in the example system in accordance with one or more embodiment of the disclosed technology.

DETAILED DESCRIPTION

Specific embodiments of the disclosed technology will now be described in detail with reference to the accompanying figures. In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

In the following description of FIGS. 1A-7, any component described with regard to a figure, in various embodiments of the disclosed technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the disclosed technology, any description of the components of a figure is to be interpreted as an optional embodiment which may be implemented in addition to, in conjunction with, or in place of the embodiments described with regard to a corresponding like-named component in any other figure.

Figure 1A:
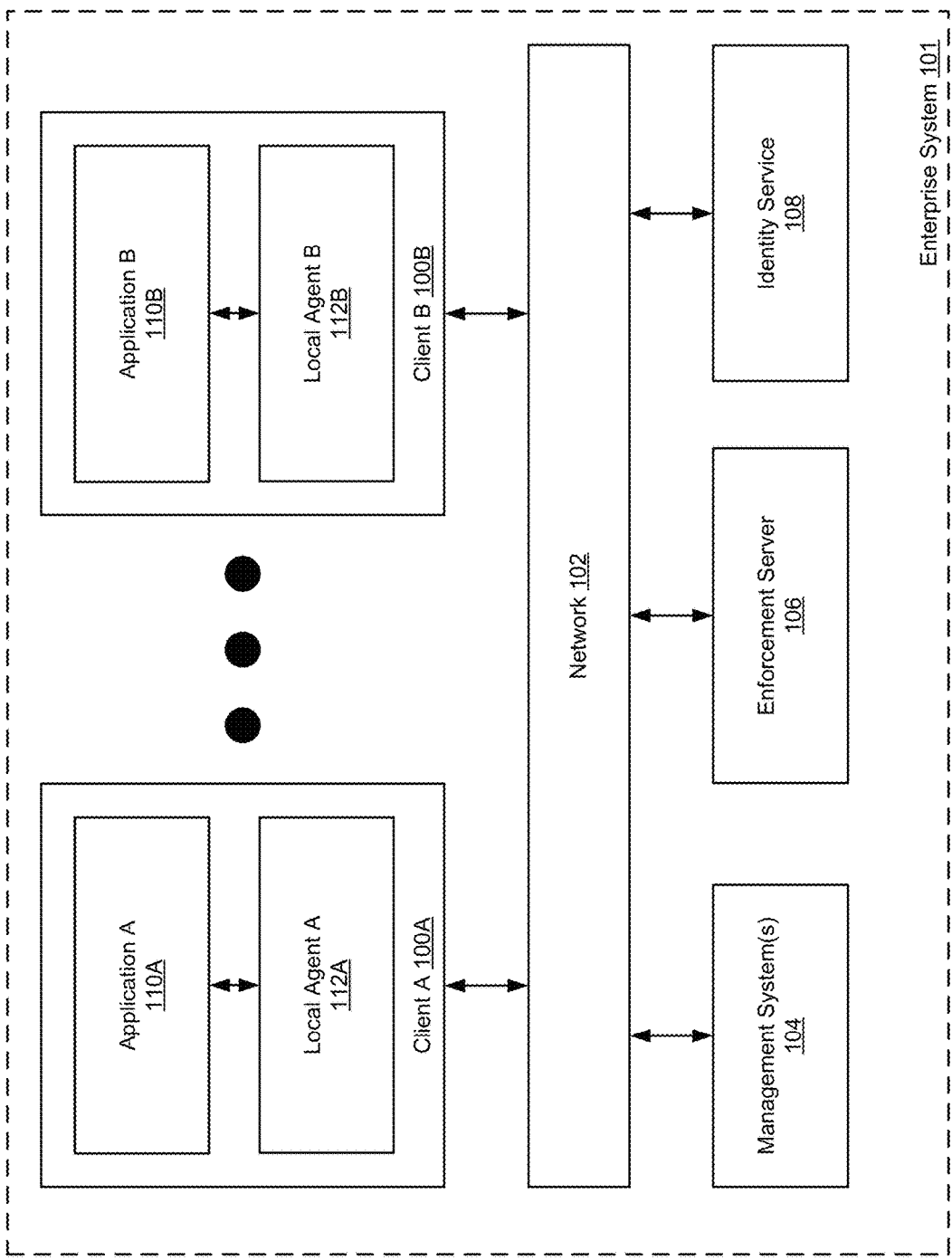
FIG. 1A shows an example system in accordance with one or more embodiments of the disclosed technology.

FIG. 1A shows an example system in accordance with one or more embodiments of the disclosed technology. The system (101) may correspond to an enterprise system, i.e., a system that is maintained by a single legal entity (e.g., a corporation, a partnership, etc.), where the legal entity controls the configuration and/or operation of the clients, management system(s), the enforcement server, and the identity service. In another embodiment of the technology, all components in the system except the identity service (or a portion thereof) may be controlled by a single legal entity. For example, if the identity service includes an authentication service, the authentication service may be operated by a $3^{rd}$ party. Those skilled in the art will appreciate that the technology is not limited to an enterprise system described above.

The system (101) may include one or more clients (100A, 100B), a management system(s) (104), an enforcement server (106), and an identity server (108). The aforementioned components may be connected to each other via a network (102), where the network (102) may be a wireless network, a wired network, or any combination thereof. Further, the network may be a wide area network, a local area network, a private network, any other type of network, or any combination thereof. Each of the aforementioned components is described below.

Figure 7:
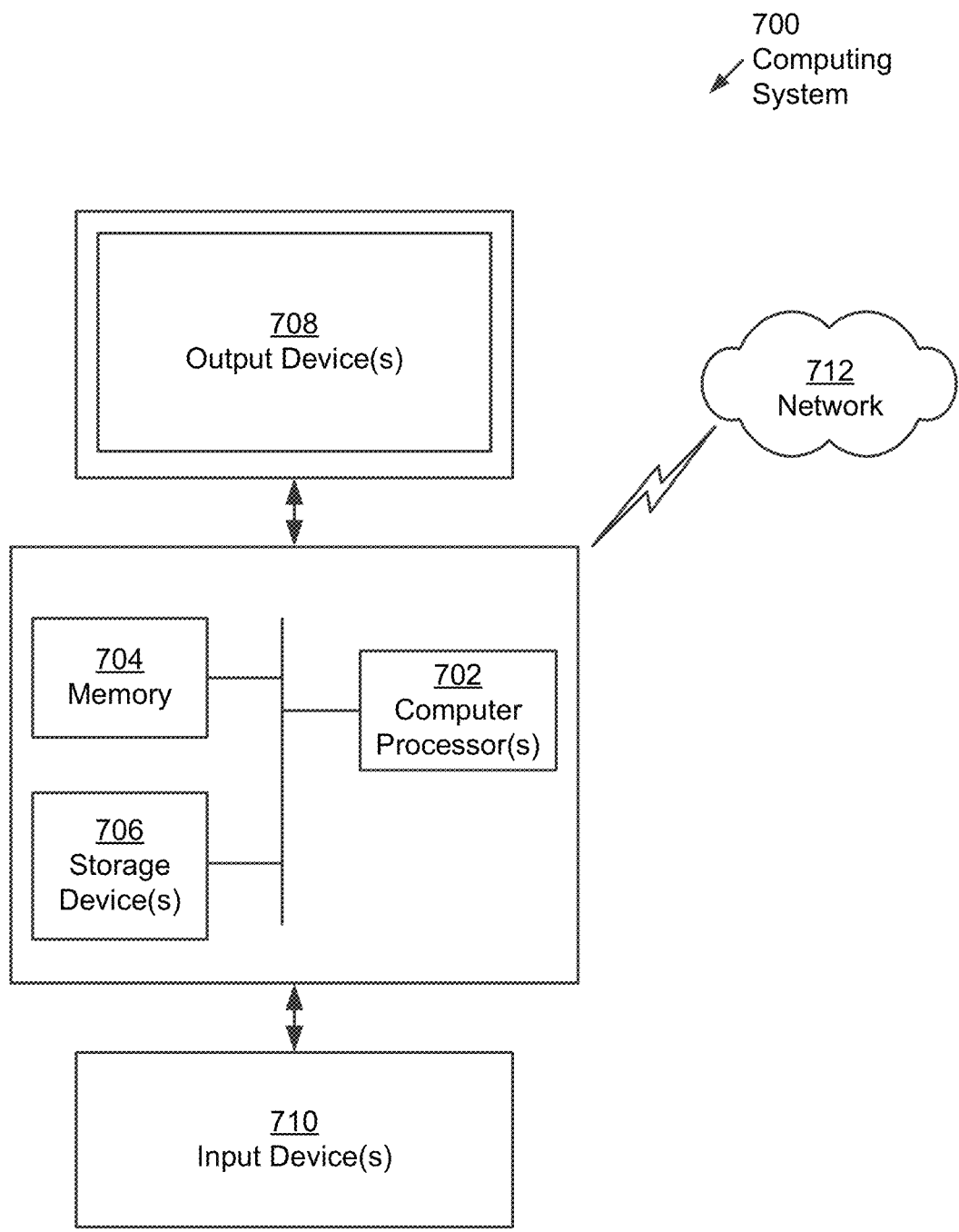
FIG. 7 shows a computing system in accordance with one or more embodiments of the disclosed technology.

In one embodiment of the technology, each client (100A, 100B) may be a computing device (see e.g., FIG. 7). Further, each client may be configured to execute one or more applications (110A, 110B) and one or more local agents (112A, 112B). An application may correspond to any program/process that includes functionality to create, open, read, modify, and/or delete a document. Examples of applications include, but are not limited to, word processing applications, document creation applications, and document dissemination applications (e.g., electronic mail applications, file transfer protocol (FTP) applications, or any other application that enables the communication of documents between clients).

In one embodiment of the technology, the local agent(s) (112A, 112B) are configured to monitor operations performed on various documents that are present on the computing device. The local agent(s) may also include functionality to perform various actions on the documents including, but not limited to, decrypting a document, encrypting a document, and permitting various operations to be performed on the document. Additional detail about the local agent(s) is described in FIGS. 1C and 3-5.

In one embodiment of the technology, the enforcement server (106) includes functionality to monitor usage and dissemination of various documents in the system. The enforcement server may also include functionality to generate a dissemination path for documents within the system. In one embodiment of the technology, the enforcement server may be implemented on a computing device (see e.g., FIG. 7). Additional detail about the enforcement server is described in FIGS. 1B, 3, 4C and 5.

In one embodiment of the technology, the identity service (108) maintains information about the users of the system, e.g., usernames, email addresses, authentication credentials, devices assigned to each user, IP addresses of devices assigned to each user, etc. The clients, the enforcement server, and the management system(s) may send requests to the identity service in order to authenticate a given user and/or to obtain information that may be used, for example, to generate a dissemination path for a document (see e.g., FIG. 5). The identity service may be implemented on a computing device (see e.g., FIG. 7).

In one embodiment of the technology, the management system(s) (104) includes functionality to configure various components within the system. Further, the management system(s) (104) may include functionality to view information gathered and/or generated by the enforcement server (see e.g., FIG. 6). Further, the management system(s) (104) may include functionality to enable users (e.g., system administrators, etc.) to create and/or modify rules associated with various documents in the system (see e.g., FIGS. 3 and 5).

Figure 1B:
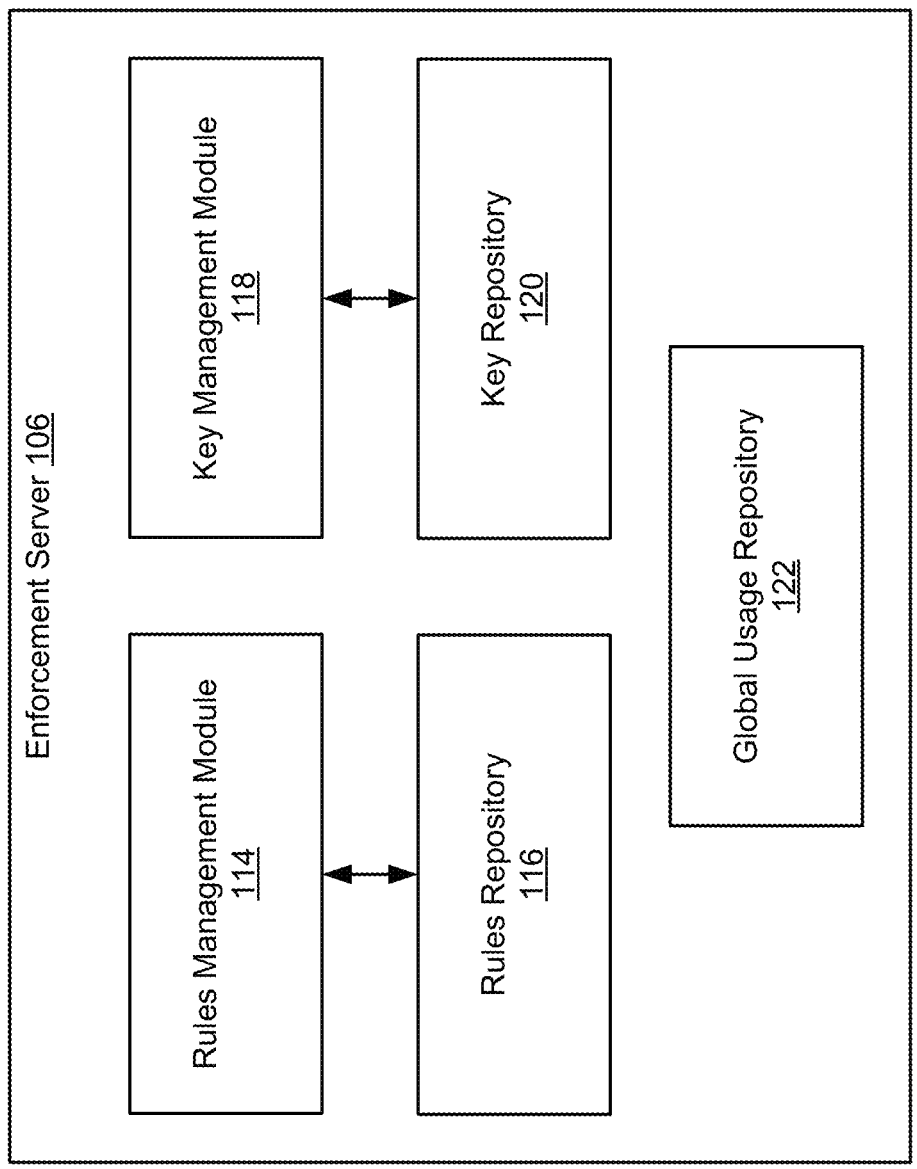
FIG. 1B shows an example enforcement server in accordance with one or more embodiments of the disclosed technology.

FIG. 1B shows an example enforcement server in accordance with one or more embodiments of the disclosed technology. The enforcement server (106) may include a rules management module (114), a rules repository (116), a key management module (118), a key repository (120), and a global usage repository (122). Each of these components is described below.

In one embodiment of the technology, the rules management module (114) includes functionality to manage the rules that govern which individuals may perform operations on a document and what operations each of the individuals may perform. Management of the rules may include, but is not limited to, (i) obtaining rules from the rules repository and providing the obtained rules to one or more local agents (see e.g., FIGS. 3 and 4C); and (ii) receiving and storing updated rules, for example, from one or more management servers (see e.g., FIG. 5).

In one embodiment of the technology, the rules repository (116) is configured to store rules for all the documents that are managed by the enforcement server. Those skilled in the art will appreciate that only a portion of all documents within the system (101) may be managed (e.g., in accordance with FIGS. 3-5) by the enforcement server and the local agent(s). Accordingly, the rules repository (116) only includes rules for these documents.

In one embodiment of the technology, the rules repository (116) includes persistent storage (e.g., solid state storage, magnetic storage, optical storage, any other type of persistent storage or any combination thereof) in which the rules are stored. The rules repository may store rules using any known or subsequently discovered mechanism. The following describes various examples of the mechanisms that may be used to store rules. The examples are not intended to limit the technology. In a first example, the local repository may be a set of magnetic hard disks. In a second example, the local repository may be implemented using a computer cluster that is executing a distributed file system. In a third example, the local repository may be implemented using a network file server and one or more block-storage devices (i.e., as a Storage Area Network).

In one embodiment of the technology, each rule specifies: (i) a document(s); (ii) a user(s) who may access the document; and (iii) what operations may be performed on the document by the user(s) identified in (ii). The document may be specified at any level of granularity, for example, the document may be specified using a unique document ID, by the location in which the document is stored, by the document type (e.g., a human resources document, a payroll document), by document format (HTML, PDF, JPEG, etc.), in any other manner that facilitates identification of the document, or any combination thereof. In certain scenarios, there may be rules that are applicable to all documents.

The user(s) who may access the document may be specified at any level of granularity. For example, the user may be specified based on a unique user ID, by user role (e.g., human resources employee, engineer, etc.), in any other manner that facilitates identification of the user, or any combination thereof.

In one embodiment of the technology, the operations that may be performed on the document may be specified at any level of granularity. For example, the rule may only specify whether a user can access and disseminate the document. In such scenarios, all other operations that the user may be perform locally on the client are permitted and logged (see e.g., FIG. 4B) by the local agent. However, the user may (or may not) be able to disseminate the document. In another example, the specific operations that the user may perform on the document, e.g., access, print, modify, etc., are explicitly specified. In another example, certain operations (e.g., taking a screen capture while the document is being displayed on a client) that may not be permitted to any user are specified in the rule. In one embodiment of the technology, there may be multiple rules associated with a given document.

Figure 3:
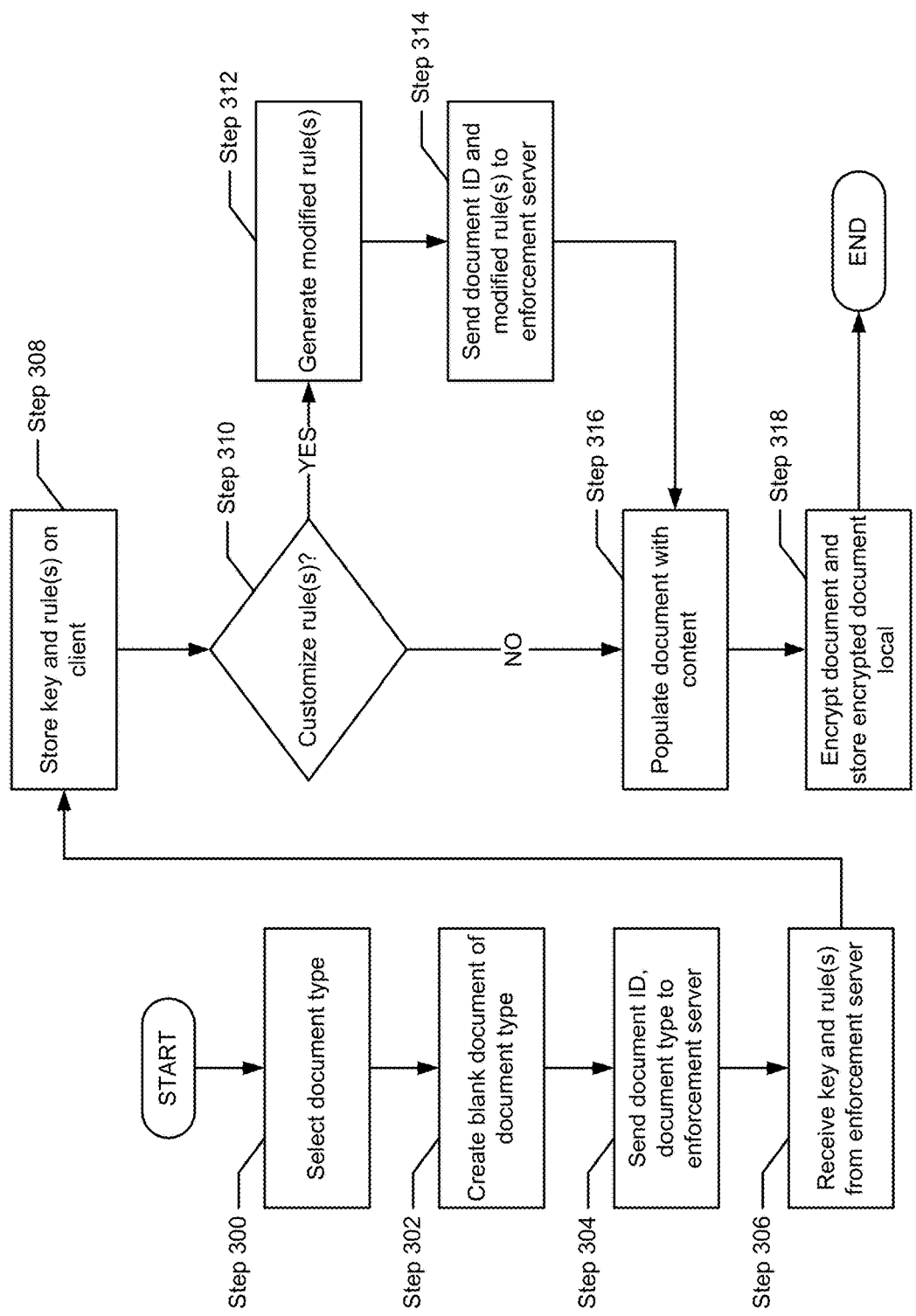
FIG. 3 shows an example method for creating a document in accordance with one or more embodiments of the disclosed technology.
Figure 4A:
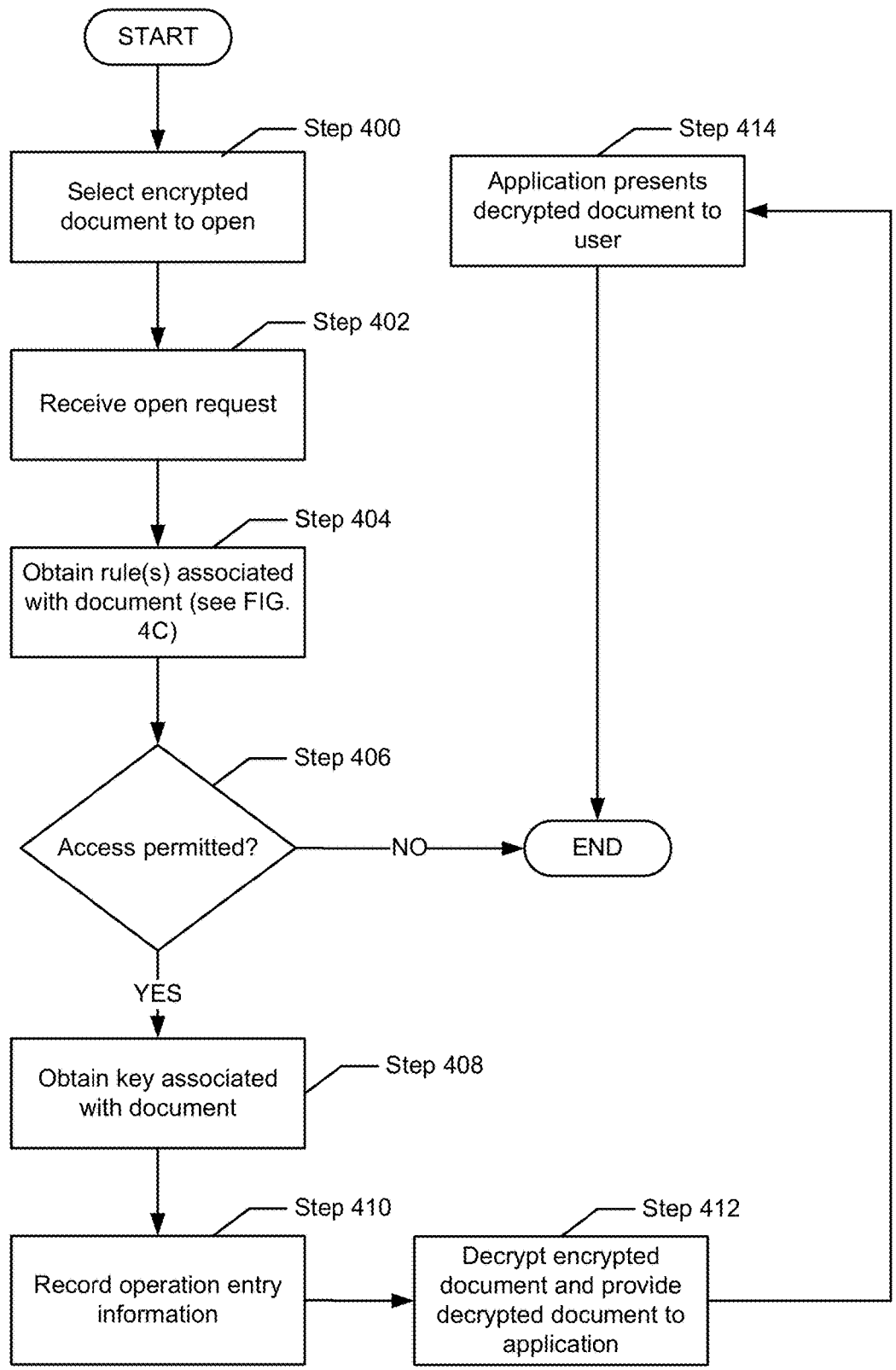
FIGS. 4A-4C show an example method for tracking user interaction with documents and document dissemination in accordance with one or more embodiments of the disclosed technology.
Figure 4B:
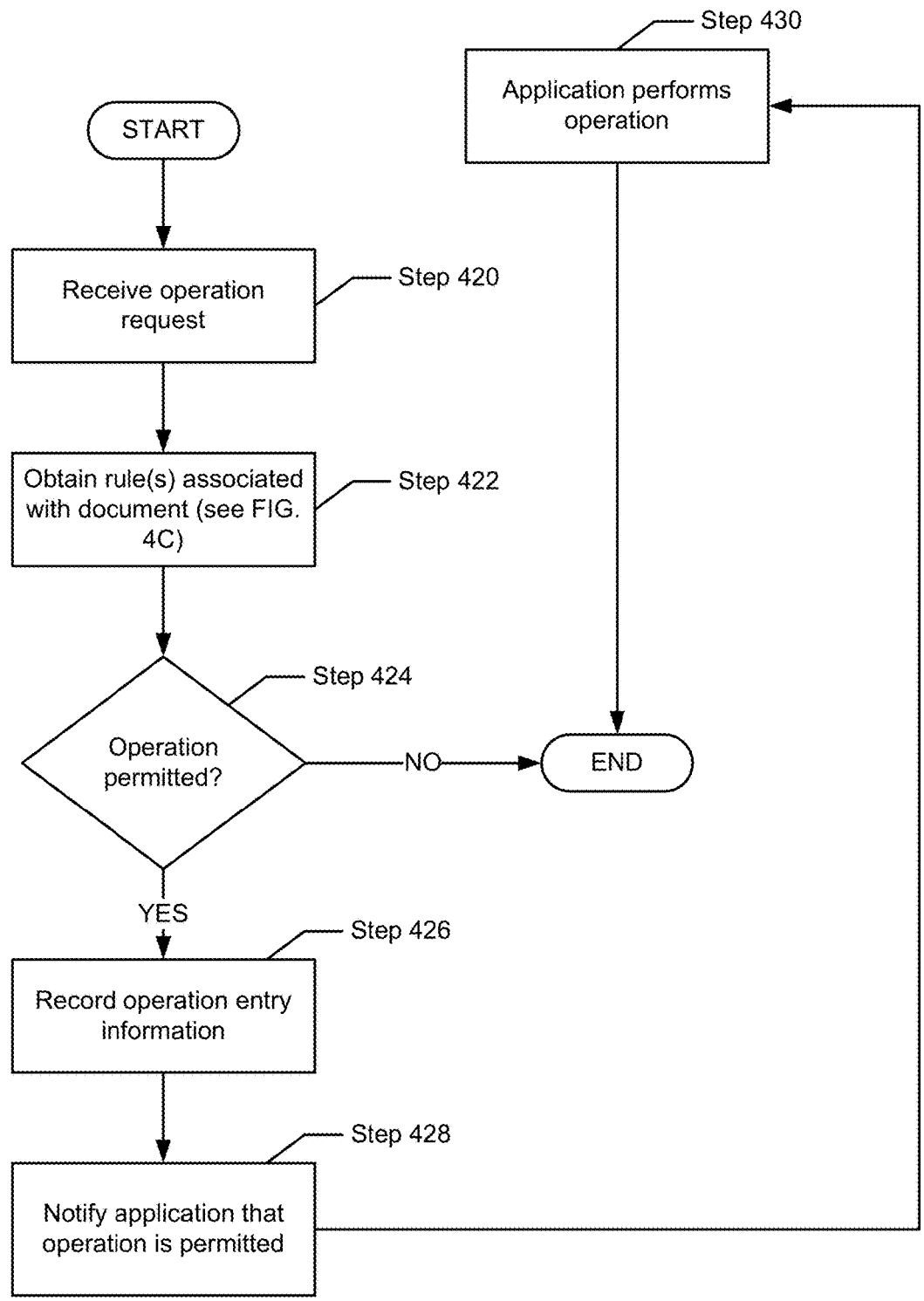
Figure 4C:
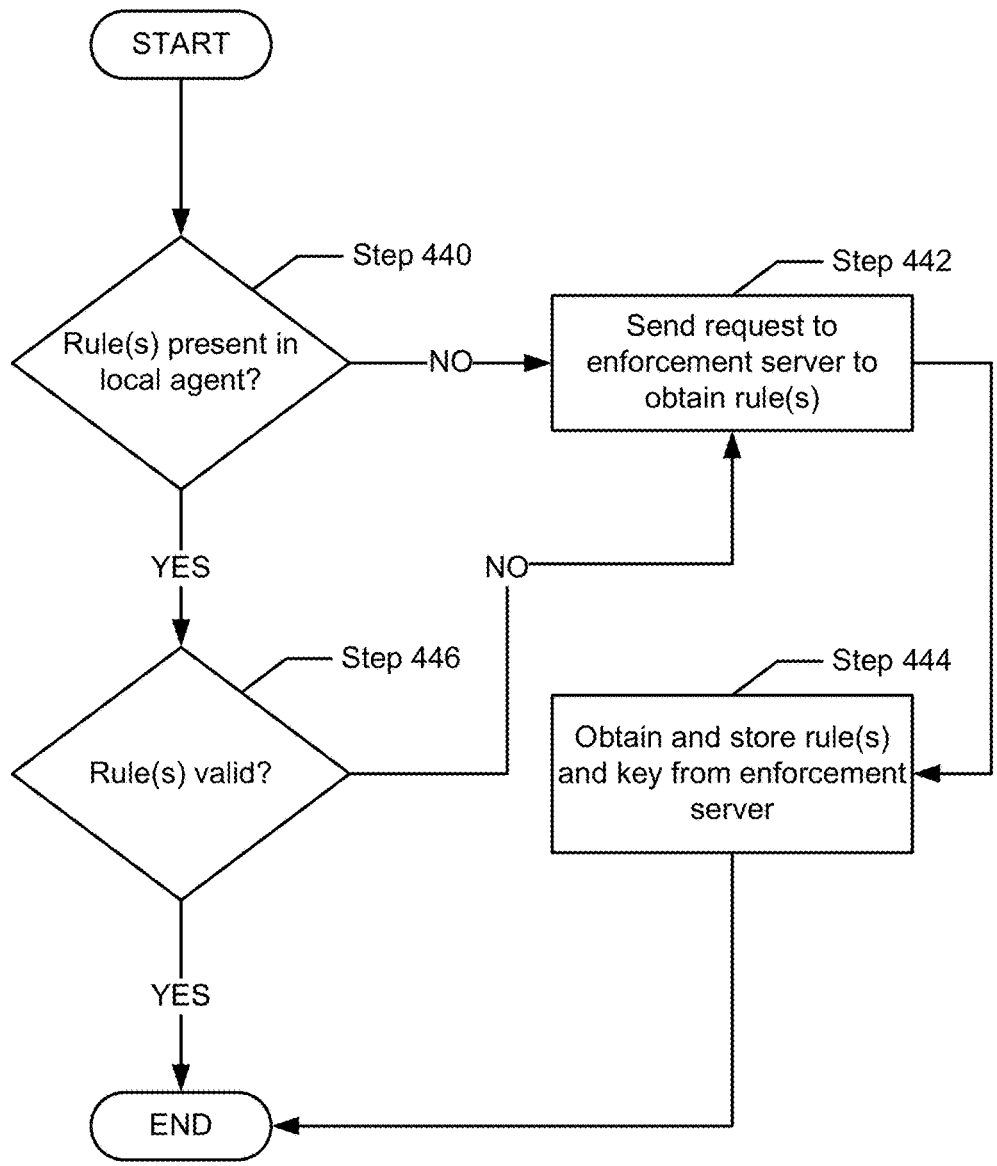

In one embodiment of the technology, a key management module (118) manages the encryption keys (also referred to as keys) used to secure documents in accordance with FIGS. 3-4C. More specifically, the key management module includes functionality to generate encryption keys (e.g., symmetric keys and/or public-private key pairs) and to associate the generated keys with documents that are managed by the enforcement server. In other embodiments the key management module may include functionality to obtain the keys from a $3^{rd}$ party service instead of or in addition to generating keys internally.

In one embodiment of the technology, there may be one or more keys associated with each document that is managed by the system. The manner in which the keys are generated and assigned may vary based on the implementation of the technology. The key management module may also include functionality to provide keys to clients in accordance with FIGS. 3-4C.

In one embodiment of the technology, a key repository (120) stores one or more keys that are obtained or generated by the key management module. The keys may be stored in manner that associates each key with one or more documents and one or more <document, user(s)> pairs.

In one embodiment of the technology, the key repository (120) includes persistent storage (e.g., solid state storage, magnetic storage, optical storage, any other type of persistent storage or any combination thereof) in which the keys are stored. The key repository may store keys using any known or subsequently discovered mechanism. The following describes various examples of the mechanisms that may be used to store keys. The examples are not intended to limit the technology. In a first example, the local repository may be a set of magnetic hard disks. In a second example, the local repository may be implemented using a computer cluster that is executing a distributed file system. In a third example, the local repository may be implemented using a network file server and one or more block-storage devices (i.e., as a Storage Area Network).

In one embodiment of the technology, a global usage repository (122) stores usage information for the documents that are managed by the enforcement server. More specifically, the global usage repository stores operation information entries generated by the local agents and provided to the enforcement server (see e.g., FIGS. 4A-5). Each operation information entry specifies, for example: (i) a document ID (or other information that may be used to uniquely identify the document); (ii) a user ID (or other information that may be used to uniquely identify the user that is performing an operation on the document); (iii) application ID, i.e., information used to identify the application that is being used to perform an operation on the document; and (iv) information about the operation.

With respect to item (iv), the information about the operation may include information such as the name of the operation performed (e.g., open, print, email, modify, etc.), a timestamp of when the operation was performed, the duration of operation, etc.

In the event that the operation is a dissemination operation (i.e., an operation that, if successfully performed, results in the document being transmitted to another client), the information about the operation may further include, for example, information about the target entity, e.g., information about the clients and/or users to which the document being sent, etc.

For example, if the dissemination operation is attaching the document to an email, then the operation information may include email addresses for intended recipients of the email. In this example, the email addresses of the recipients may be referred to as target IDs that are associated with the target entity. The resolution of the target entity based on the target ID is described below with respect to FIG. 5.

In another example, if the dissemination operation is transferring the document via an FTP application, then the operation information may include the IP address or host name for the intended recipient (i.e., client) of the document transferred via FTP. In this example, the IP address or host name of the recipients may be referred to as target IDs that are associated with the target entity. The resolution of the target entity based on the target ID is described below with respect to FIG. 5.

Those skilled in the art will appreciate that the technology is not limited to the aforementioned dissemination operations.

Figure 1C:
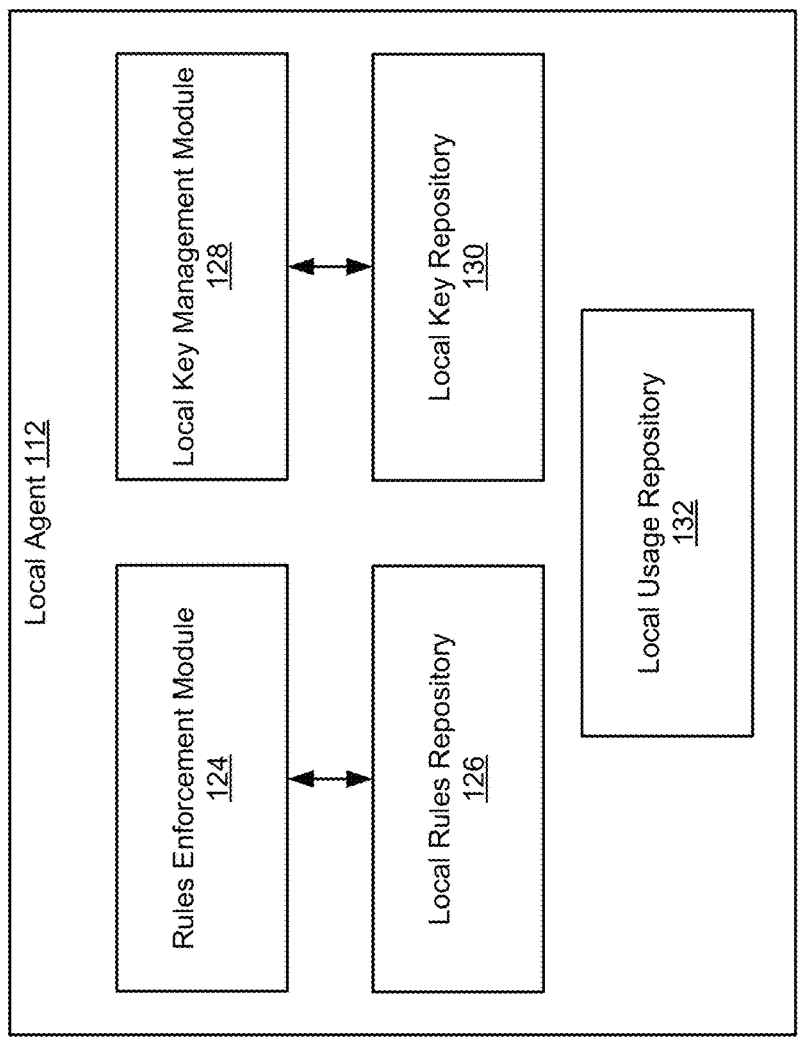
FIG. 1C shows an example local agent in accordance with one or more embodiments of the disclosed technology.

FIG. 1C shows an example local agent in accordance with one or more embodiments of the disclosed technology. The local agent may include a rules enforcement module (124), a local rules repository (126), a local key management module (128), a local key repository (130), and a local usage repository (132). Each of these components is described below.

In one embodiment of the technology, the rules enforcement module (124) includes functionality to perform the methods shown in FIG. 4A-4C. In one embodiment of the technology, the local rules repository (126) stores the rules of the documents on the client that are being managed by the enforcement server. Said another way, the local rules repository may include a subset of the rules that are stored in the rules repository (120).

In one embodiment of the technology, the local key management module (128) interfaces with the rules enforcement engine (124) in order to obtain keys from the local key repository (130) in response to requests from the rules enforcement module (124). In one embodiment of the technology, the local key repository (130) stores keys for the documents on the client that are being managed by the enforcement server. Said another way, the local key repository may include a subset of the key that are stored in the key repository (130). In one embodiment of the technology, the local usage repository (132) stores log operation entries that are generated by the local agent.

In one embodiment of the technology, while the various repositories shown in FIGS. 1B and 1C are located with the enforcement server and/or the local agent, those skilled in the art will appreciate that the repositories may be located external to the enforcement server and/or the local agents without departing from the technology. For example, the rules repository, the global usage repository, and the key repository may be located external to the enforcement server and the local rules repository, local usage repository, and the local key repository may be located external to the local agents (e.g., on persistent storage operatively connected to the same computing devices on which the local agent is executing).

While FIGS. 1A-1C shows a configuration of components, other configurations may be used without departing from the scope of the technology. For example, various components may be combined to create a single component. As another example, the functionality performed by a single component may be performed by two or more components.

Figure 2B:
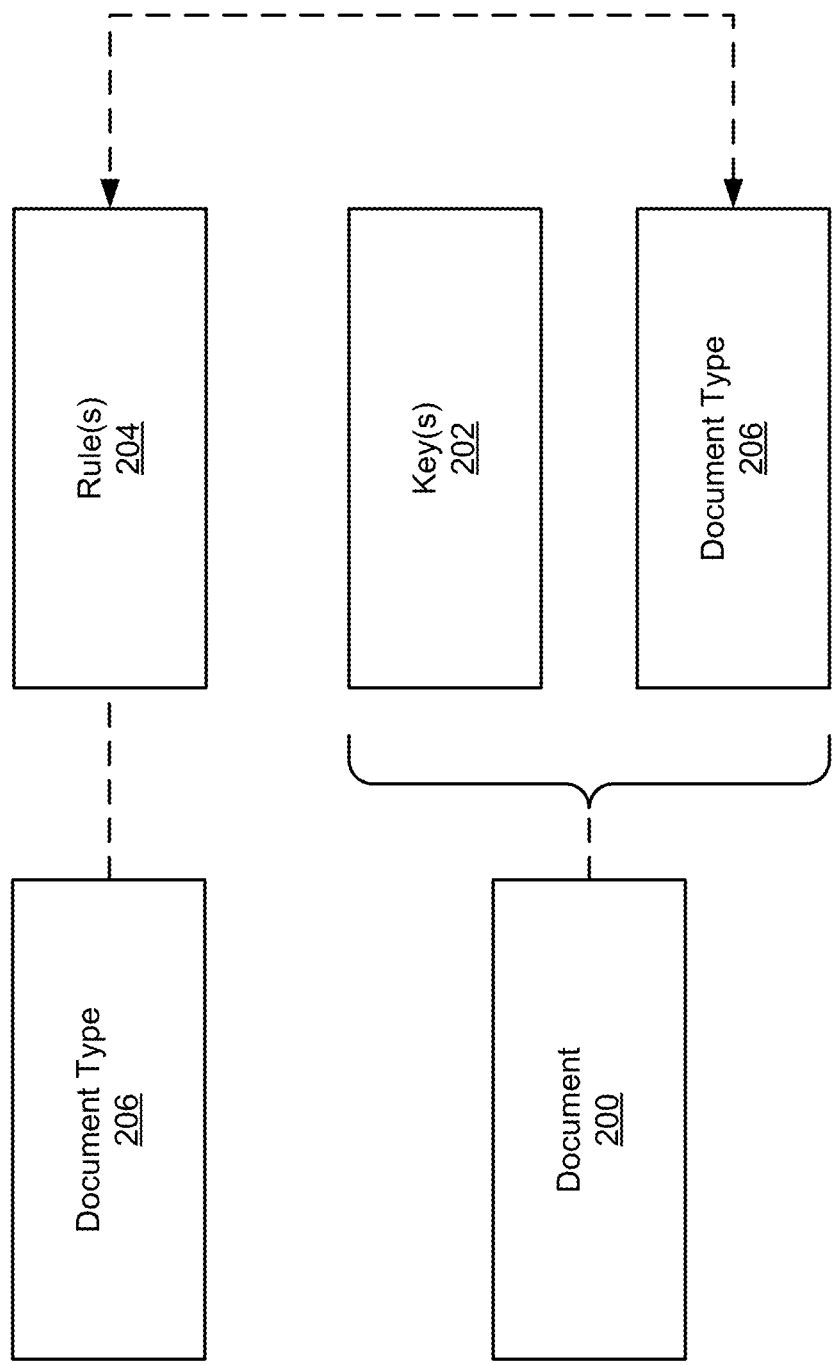

FIGS. 2A-2B show the relationship between various components in the system in accordance with one or more embodiment of the disclosed technology. The enforcement server (106) may include one or more data structures to one or more of the following relationships.

Turning to FIG. 2A, in one embodiment of the technology, each document (200) may be associated with one or more key(s) (202) and one or more rule(s) (204). In one embodiment of the technology, a document (200) may also be referred to as content. The content may correspond to any type of data that may be stored in the content repository. Examples of content may include, but are not limited to, text files, audio files, image files, and/or audio-visual files.

Turning to FIG. 2B, a document (200) may be associated with one or more keys (202) and a document type (206), where the document type (206) is associated with one or more rule(s) (204).

Turning to the flowcharts, while the various steps in the flowcharts are presented and described sequentially, one of ordinary skill will appreciate that some or all of the steps may be executed in different orders, may be combined or omitted, and some or all of the steps may be executed in parallel.

FIG. 3 shows an example method for creating a document in accordance with one or more embodiments of the disclosed technology. The method shown in FIG. 3 may be performed by a user via a client (see e.g. FIG. 1A, 100A, 100B).

In step 300, the user, via an application, selects a document type to create. For example, the user may select to create a payroll document. In one embodiment of the technology, the document types may be preset by a system administrator.

In step 302, a blank document of the selected document type is created. For example, the document type may be associated with a template and in step 302 the document of the selected document type may be created based on the aforementioned template. The creation of the document may also result in the generation of a document ID. The document ID may a unique number, the document name, another alpha-numeric string, or any combination thereof. The document ID may be created by the application, the local agent, or another process executing on the client.

In step 304, local agent detects the creation of a document, obtains the document ID and document type, and sends this information to the enforcement server. The local agent may also send additional information about the document, for example, the document format, the current user of the client on which the local agent is executing, etc.

Though not shown in FIG. 3, upon receipt of the aforementioned information by the enforcement server, the enforcement server generates (or obtains) a key(s) to use to secure the document and also obtains one or more rules associated with the document. More specifically, in one embodiment of the technology, the enforcement server may identify one or more rules in the rules repository that apply to the document (see e.g. FIG. 1B). The identification of the rules may be based on, for example, the document type, the document format, the current user of the client on which the local agent is executing, any other information and/or any combination thereof.

Once the above processing has been completed by the enforcement server, the enforcement server sends the key and one or more rules to the local client.

In step 306, the local client receives the key and one or more rules associated with the document. In step 308, the local agent stores the rule(s) in the local rules repository and the key in the local key repository. The rule(s) and key are stored in manner that associates the key and rule(s) with the document.

In step 310, a determination is made about whether the rule(s) obtained in step 310 is to be customized (i.e., modified). If the rule(s) is to be modified, then the process proceeds to step 312; otherwise, the process proceed step 316.

In step 312, a modified rule(s) is generated. The modified rule may be generated by the user that initiated the document creation in step 300. In one embodiment of the technology, only users with certain privileges may be permitted to modify rules obtained from the enforcement server. In step 314, the modified rule(s) and the document ID are sent to the enforcement server for storage.

In step 316, the document is populated with initial content. Those skilled in the art will appreciate that the document may be populated with content at any point prior to step 318. In step 318, the document is encrypted using the key obtained in step 306 and stored on the client.

In one embodiment of the technology, the documents that are managed by the enforcement server are stored in encrypted form (i.e., encrypted at rest) on the clients.

FIGS. 4A-4C show example methods for tracking user interaction with documents and document dissemination in accordance with one or more embodiments of the disclosed technology. The methods shown in FIGS. 4A-4C may be performed when a user on a client attempts to open a document that was previously stored on the client (including scenarios in which the document was initially created on the client).

Turning to FIG. 4A, FIG. 4A shows a method for processing open requests in accordance with one or more embodiments of the technology.

In step 400, the user, using an application executing on the client, selects a document to open. The selection action may trigger the issuance of an open request.

In step 402, the open request is intercepted by a local agent. In one embodiment of the technology, the local agent includes functionality to intercept operation requests that are performed on a document by an application. This may include intercepting requests where the document is open within the application and the application is attempting to perform on operation on the document (e.g., print, modify, send the document to a target entity, etc.). Another example of requests that may be intercepted are requests performed by certain applications where the document is not open within the application, e.g., operations that are attempting to be performed a screen capture application.

Continuing with the discussion of FIG. 4A, in step 404 one or more rules associated with the document are obtained. In one embodiment of the technology, one or more rules associated with the document may be obtained. For example, there may be a rule obtained based on the document type and a second rule obtained that is specific to the document itself (i.e., the rule specifies the document ID). Additional details of step 404 are provided in FIG. 4C.

In step 406, a determination is made about whether access to the document is permitted (i.e., can the document be opened by the requesting application). The determination in step 406 is based on whether all rules obtained in step 404 are satisfied. Said another way, access may only be permitted to the document if access is permitted under each of the rules obtained in step 404. If access is not permitted, the process ends; otherwise, the process proceeds to step 408.

In step 408, the key associated with the document is obtained from the local key repository. In one embodiment, the key is obtained when the rule(s) associated with the document are initially provided to the local agent (see e.g., FIGS. 3 and/or 4C).

In step 410, an operation information entry (as described above) is created and stored in the local usage repository. The information stored in the operation information entry may vary based on the operation and the implementation of the technology. Those skilled in the art will appreciate that step 410 may be performed at any time after step 406. Further though not shown in FIG. 4A, an operation information entry may also be created when an access request fails.

Continuing with the discussion of FIG. 4A, in step 412, the encrypted document is decrypted using the key obtained in step 408. In step 414, the decrypted document is presented to the user via the application that was used to initiate the open document request in step 400.

Turning to FIG. 4B, FIG. 4B shows a method for processing operation requests in accordance with one or more embodiments of the technology. More specifically, FIG. 4B shows a method that may be performed once a document has been opened by an application. The method shown in FIG. 4B may also occur when the application does not need to open the document (e.g., the application is an electronic mail application and the operation is emailing the document as an attachment).

In step 420, an operation request is received, where the operation request corresponds to a request that was intercepted by the local agent. As discussed above, the local agent includes functionality to intercept all (or a portion) of the operation requests from applications.

In Step 422, one or more rules associated with the document are obtained. In one embodiment of the technology, multiple rules associated with the document may be obtained. For example, there may be a rule obtained based on the document type and a second rule obtained that is specific to the document itself (i.e., the rule specifies the document ID). The local agent may obtain the necessary information about the operation and the document in order to identify all rules that apply. Additional details of step 422 are provided in FIG. 4C.

In step 424, a determination is made about whether the operation is permitted to be performed on the document. The determination in step 424 is based on whether all rules obtained in step 422 are satisfied. Said another way, access may only be permitted to the document if access is permitted under each of the rules obtained in step 422. If access is not permitted, the process ends; otherwise, the process proceeds to step 426.

In step 426, an operation information entry (as described above) is created and stored in the local usage repository. The information stored in the operation information entry may vary based on the operation and implementation of the technology. Those skilled in the art will appreciate that step 426 may be performed at any time after step 424. Further though not shown in FIG. 4A, an operation information entry may also be created when an operation request fails (i.e., the operation is not permitted to be performed on the document).

In step 428, the application (i.e., the application that issued the operation request that was subsequently intercepted in step 420) is notified that the operation is permitted on the document.

In Step 430, the application performs the operation. In certain scenarios, the local agent may obtain the key associated with the document and decrypt the document prior to step 428 in order to allow the application to perform the operation on the decrypted document. The document may not need to be decrypted if the document was initially accessed in accordance with FIG. 4B.

Turning to FIG. 4C, FIG. 4C shows a method for obtaining rules associated with a document in accordance with one or more embodiments of the technology.

In step 440, a determination is made about whether there are any rules associated with the document stored on the local agent. If there are no rules stored on the local agent, the process proceeds to step 442; otherwise, the process proceeds to step 446.

In step 442, the local agent sends a request to the enforcement server to obtain the rule(s) associated with the document. The request may include, for example, the document ID and any other information that is necessary to obtain the rule(s) associated with the document.

In step 444, the local agent receives, in response to the request in step 442, the rule(s) and key associated with the document from the enforcement server. The local agent subsequently stores the rule(s) and the key. The process then ends.

In step 446, in the event that the rule(s) associated with the document is present on the local agent, a determination is made about whether the rule(s) is valid. If the rule is valid, the process ends; otherwise, the process proceeds to step 442. In one embodiment of the technology, the rule(s) may specify one or more conditions that indicate whether the rule can be used. For example, the rule may specify a duration for which the rule is valid (e.g., the rule is valid until midnight on Dec. 31, 2014). By specifying validity conditions on rules, the enforcement server may ensure that the local agent at least periodically checks whether an updated rule for the document is present on the enforcement server.

In one embodiment of the technology, after FIG. 3 or FIGS. 4A-4C are initially performed and the document is open, the local agent may periodically perform steps 404, 406, and 410. This may allow the system to ensure that the user of the client is still permitted to access the document. Said another, by periodically checking whether the user is permitted to access the application, local agent is able to continually ensure that the user has access to document in the event that there is a change in the rule(s) associated with the document. Further, in the event that the local agent determines that access is to be revoked after initially permitting access, the local agent may instruct the application to close the document and may reencrypt the document. Further, the local agent may also delete any keys that may be used to decrypt the document from the local agent to prevent any unauthorized access to the reencrypted document.

Figure 5:
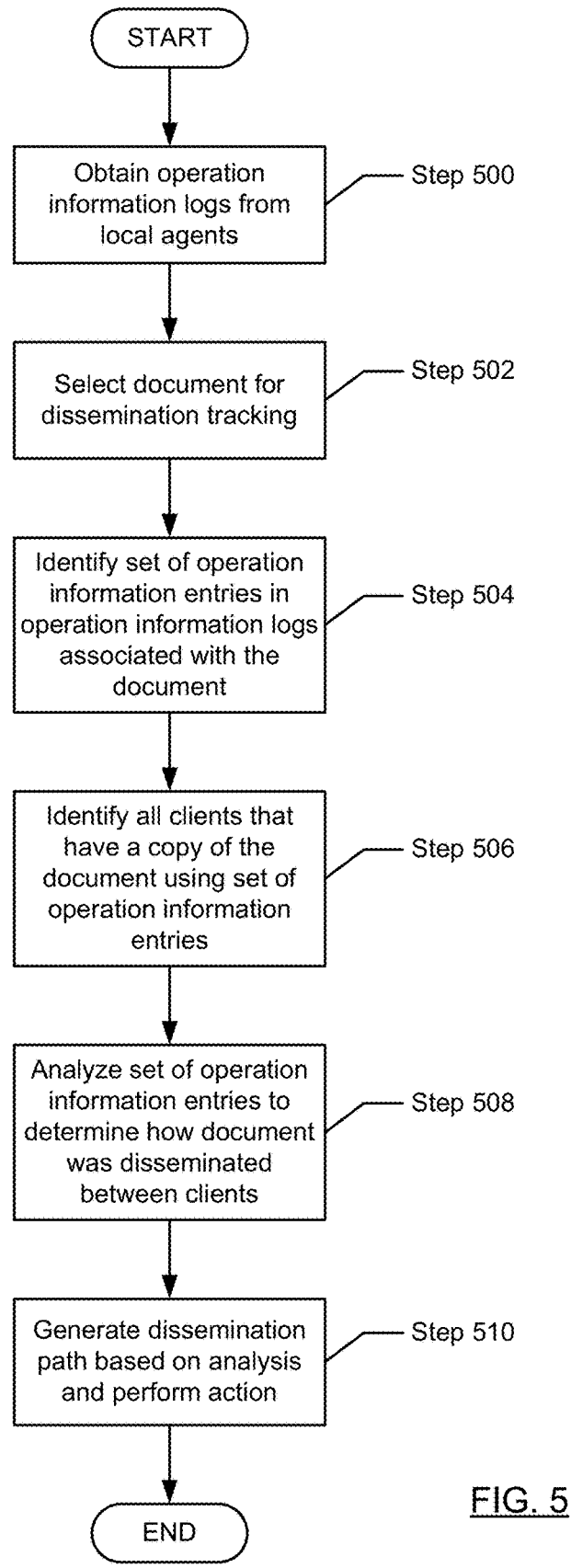
FIG. 5 shows an example method for generating a dissemination path in accordance with one or more embodiments of the disclosed technology.

FIG. 5 shows an example method for generating a dissemination path in accordance with one or more embodiments of the disclosed technology.

In step 500, the enforcement server obtains operation information logs (i.e., files that include operation information entries) from the local agents. The operation information log may only be obtained when requested by the enforcement server and/or may be periodically sent from the local agents to the enforcement server. Step 500 may be performed independent of the method shown in FIG. 5.

Continuing with the discussion of FIG. 5, in step 502, a document is selected for dissemination tracking. More specifically, a document is selected for which dissemination analysis is to be performed.

In step 504, the operation information logs are processed to find all operation information entries that include a document ID associated with the document selected in step 502. The resulting operation information entries may be referred to as a set of operation information entries.

In step 506, the set of operation information entries is analyzed to determine all clients that have (or may have had) a copy of the selected document.

In step 508, the set of operation information entries is analyzed to determine how the document was communicated between the various clients identified in step 506. In one embodiment of the technology, the analysis in step 508 may include: (i) identifying all operation information entries that are associated with a dissemination operation (e.g., an email operation, an FTP operation, etc.) and (ii) determining a target entity (i.e., user of a client) that was a receipt of the document via a dissemination operation, e.g., determining that user A received an email with the document attached from user B.

In one embodiment of the technology, the determination in (ii) may require the use of an identity service. For example, if operation information entry specifies an email address but not the name of the user, then the identity service may be used to resolve the user associated with the email address. In this example, the email address is a target ID and the name of the user (i.e., username) is the target entity.

In step 510, a dissemination path of the document is generated based on the analysis performed in step 508. The dissemination path may be stored as metadata associated with the document. The dissemination path may be stored in a manner that allows the dissemination path to be indexed, where users may subsequently issue search queries against the indexed dissemination paths in order to identify specific dissemination paths. Further, one or more actions may be performed using the aforementioned dissemination path. The following section lists various non-limiting examples of actions.

Example 1

The action may be to present the dissemination path for the document to a management server such that a system administrator or auditing entity may analyze the dissemination path. The dissemination path may be analyzed along with other dissemination paths for other documents in order to determine trends related to document dissemination in the enterprise.

Example 2

The action may be to issue a delete request to all clients that have a copy of the document, where the clients are identified in the dissemination path.

Example 3

The action may be to issue an update rule request to all clients that have a copy of the document, where the clients are identified in the dissemination path. The update rule request results in an updated rule associated with the document being transmitted to each of the clients and then subsequently applied to the document by the local agent.

Figure 6:
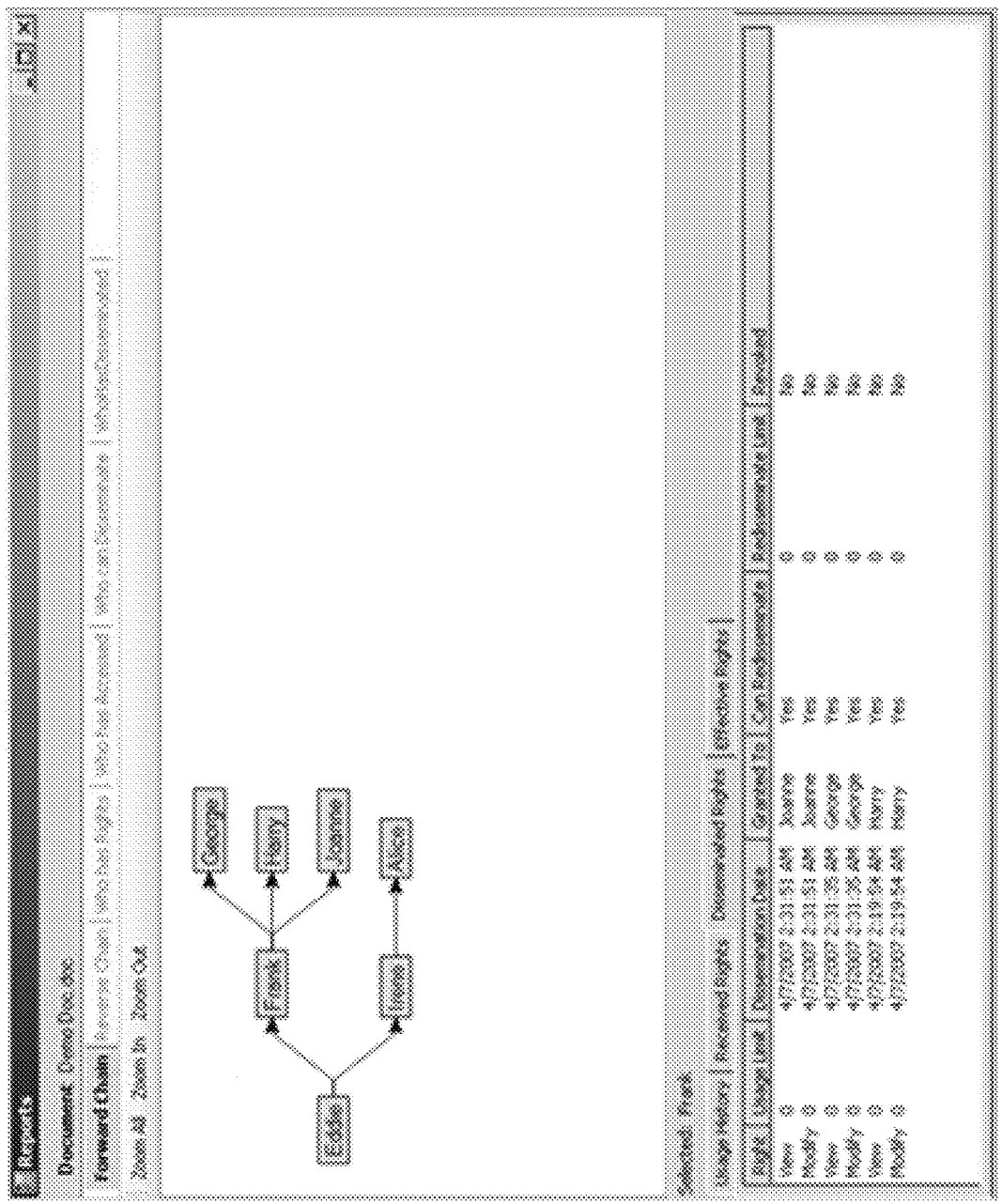
FIG. 6 shows an example graphical user interface in accordance with one or more embodiments of the disclosed technology.

FIG. 6 show an example in accordance with one or more embodiments of the disclosed technology. The example is not intended to limit the scope of the disclosed technology.

Turning to FIG. 6, consider a scenario in which Eddie creates a document and then subsequently sends the document to Frank and Irene. Upon receipt of the document Frank sends the document to George, Harry, and Joanne. Further, Irene sends the document to Alice.

In this scenario, the document is managed by an enforcement server and each of the above users uses a client that includes a local agent. Based on the above scenario, the local agents on each of the aforementioned clients generates and sends operation information entries to the enforcement server. The enforcement server may subsequently perform the dissemination analysis for the document and generate the dissemination path shown in FIG. 6. In one embodiment of the technology, the identify service may be used to resolve target IDs (e.g., email addresses, IP addresses, host names, etc.) to target entities (e.g., clients or users of client/computing devices).

As shown in FIG. 6 the dissemination path includes the names of the users as nodes and directed edges connecting the nodes, which denote the direction in which the document was disseminated with the individual users.

Embodiments of the technology enable a granular level of visibility into how a document is disseminated in a system. The knowledge of who has a document and how the document was disseminated may allow for better control of sensitive documents within an organization and/or allow for a more granular audit trail related to document access and usage.

Embodiments of the technology enable the enforcement server to generate a topology of how all (or a certain subset) of documents are maintained across clients in the system. This information may be used to identify documents that are required for litigation and also to identify which individual and/or computing systems may have information and/or documents that would be relevant to the litigation. Further, the aforementioned information may be used to identify duplicate copies of the document in the system in order to minimize the amount of space required to archive the documents (i.e., only one copy of the document may be archived as opposed to all copies of the document).

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the disclosed technology has been described with respect to a limited number of embodiments, those skilled in the art, having benefit of this disclosure, will appreciate that other embodiments can be devised which do not depart from the scope of the disclosed technology as disclosed herein. Accordingly, the scope of the disclosed technology should be limited only by the attached claims.

What is claimed is:

1. A method for managing document dissemination, comprising:
   at a computer communicatively connected to a plurality of clients, the computer having a processor and a non-transitory memory containing instructions to perform the method comprising:
   obtaining a plurality of operation logs from a plurality of local agents, wherein each of the plurality of local agents is executing on one of a plurality of clients;
   identifying a document stored on a client of the plurality of clients, wherein at least one of the plurality of operation logs includes an operation information entry indicating a request by an application running the client to disseminate the document, the request having been intercepted by one of the plurality of local agents;

determining, using the at least one of the plurality of operation logs, a dissemination path of the document between the plurality of clients, the dissemination path comprising an ordered sequence of nodes, wherein said determining comprises resolving information about one or more target entity IDs in the at least one of the plurality of operation logs to one or more target entities, the dissemination path specifying entities between which the document was communicated and a direction of communication, wherein said determining includes determining that the operation information entry included in the at least one of the plurality of operation logs is associated with a dissemination operation; and performing an action based on the determined dissemination path of the document, wherein the action includes one or more of:
issuing a delete request to one or more clients identified in the dissemination path, or
issuing an update rule request to one or more clients identified in the dissemination path.

2. The method of claim 1, further comprising:
determining usage information for the document using the at least one of the plurality of operation logs.

3. The method of claim 1, wherein the action comprises:
displaying the determined dissemination path on a graphical user interface.

4. The method of claim 1,
wherein the determined dissemination path is a directed graph,
wherein each node in the directed graph is one of the plurality of clients; and
wherein each node is connected to at least one other node using a directed edge.

5. The method of claim 1, wherein the action comprises:
sending the delete request to each of the clients specified in the determined dissemination path based on a rule associated with the document.

6. The method of claim 1, wherein the action comprises:
sending the update rule request to each of the clients specified in the determined dissemination path to update at least one rule in a local rule repository associated with the document, wherein the update rule request comprises an updated rule, wherein the updated rule specifies at least one operation that may be performed on the document.

7. The method of claim 1, wherein the action comprises:
sending a report comprising the determined dissemination path and usage information for the document to an auditing entity.

8. The method of claim 1, wherein the at least one of the plurality of operation logs comprises an operation information entry that specifies a document ID associated with the document, an application that was used to disseminate the document, and a target entity ID to which the document was disseminated.

9. The method of claim 8, wherein determining the dissemination path of the document comprises identifying a target entity of the one or more target entities from the target entity ID using an identity service.

10. The method of claim 9, wherein the application is an electronic mail (email) application, the target entity ID is an email address, and the target entity is a user.

11. The method of claim 9, wherein the application is a file transfer protocol (FTP) application, the target entity ID is an Internet Protocol (IP) address, and the target entity is a user.

12. A non-transitory computer readable medium comprising computer readable program code, which when executed by a computer processor enables the computer processor to:
obtain, from a plurality of clients communicatively connected to the computer processor, a plurality of operation logs from a plurality of local agents, wherein each of the plurality of local agents is executing on one of a plurality of clients;

identify a document stored on a client of the plurality of clients, wherein at least one of the plurality of operation logs includes an operation information entry indicating a request by an application running on the client to disseminate the document, the request having been intercepted by at least one of the plurality of local agents;

determine, using the at least one of the plurality of operation logs, a dissemination path of the document between the plurality of clients, the dissemination path comprising an ordered sequence of nodes, wherein said determining comprises resolving information about one or more target entity IDs in the at least one of the plurality of operation logs to one or more target entities, the dissemination path specifying entities between which the document was communicated and a direction of communication, wherein said determining includes determining that the operation information entry included in the at least one of the plurality of operation logs is associated with a dissemination operation; and perform an action based on the dissemination path of the document, wherein the action includes one or more of:
issuing a delete request to one or more clients identified in the dissemination path, or
issuing an update rule request to one or more clients identified in the dissemination path.

13. The non-transitory computer readable medium of claim 12, further comprising computer readable program code, which when executed by the computer processor enables the computer processor to:
determine usage information for the document using the at least one of the plurality of operation logs.

14. The non-transitory computer readable medium of claim 12, wherein the action comprises:
displaying the determined dissemination path on a graphical user interface
wherein the determined dissemination path is a directed graph,
wherein each node in the directed graph is one of the plurality of clients; and
wherein each node is connected to at least one other node using a directed edge.

15. The non-transitory computer readable medium of claim 12, wherein the action comprises:
sending the delete request to each of the clients specified in the determined dissemination path based on a rule associated with the document.

16. The non-transitory computer readable medium of claim 12, wherein the action comprises:
sending the update rule request to each of the clients specified in the determined dissemination path to update at least one rule in a local rule repository associated with the document, wherein the update rule request comprises an updated rule, wherein the updated rule specifies at least one operation that may be performed on the document.

17. The non-transitory computer readable medium of claim 12, wherein the at least one of the plurality of operation logs comprises an operation information entry that specifies a document ID associated with the document, an application that was used to disseminate the document, and a target entity ID to which the document was disseminated.

18. The non-transitory computer readable medium of claim 17, wherein determining the dissemination path of the document comprises identifying a target entity of the one or more target entities from the target entity ID, and wherein the application is an electronic mail (email) application, the target entity ID is an email address, and the target entity is a user.

19. The non-transitory computer readable medium of claim 17, wherein determining the dissemination path of the document comprises identifying the target identity from the target entity ID, and wherein the application is a file transfer protocol (FTP) application, the target entity ID is an Internet Protocol (IP) address, and the target entity is a user.

20. A system, comprising:
a plurality of computing devices, wherein each of the plurality of computing devices comprises a processor and a non-transitory memory containing instructions to execute a local agent on the computing device;
an enforcement server operatively connected to the plurality of computing devices via a network,
wherein the enforcement server is configured to:
receive a plurality of operation logs from a plurality of local agents, wherein each of the local agents is executing on one of a plurality of computing devices;
identify a document stored on a computing device of the plurality of computing devices, wherein at least one of the plurality of operation logs includes an operation information entry indicating a request by an application running on the computing device to disseminate the document, the request having been intercepted by one of the plurality of local agents;
determine, using the at least one of the plurality of operation logs, a dissemination path of the document between the plurality of computing devices, the dissemination path comprising an ordered sequence of nodes, wherein said determining comprises resolving information about one or more target entity IDs in the at least one of the plurality of operation logs to one or more target entities, the dissemination path specifying entities between which the document was communicated and a direction of communication, wherein said determining includes determining that the operation information entry included in the at least one of the plurality of operation logs is associated with a dissemination operation; and
perform an action based on the dissemination path of the document, wherein the action includes one or more of:
issuing a delete request to one or more clients identified in the dissemination path, or
issuing an update rule request to one or more clients identified in the dissemination path.

* * * * *